Aug. 16, 1949.          R. E. PRENTICE          2,479,254
VIEW FINDER FOR CAMERAS
Filed Feb. 27, 1946
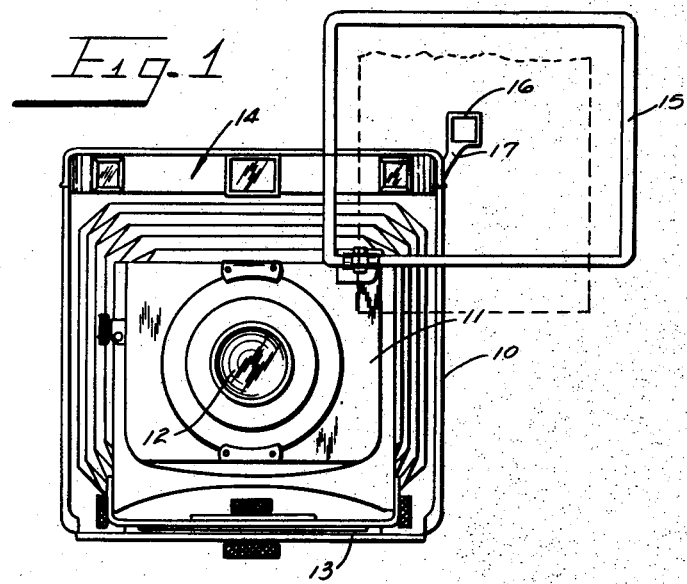
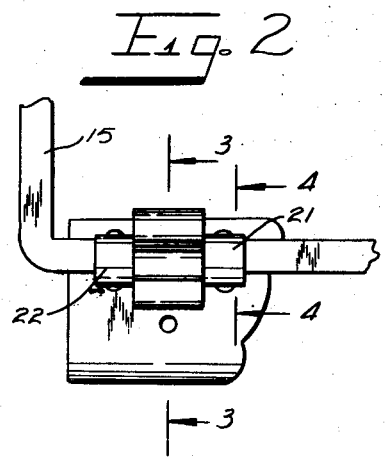
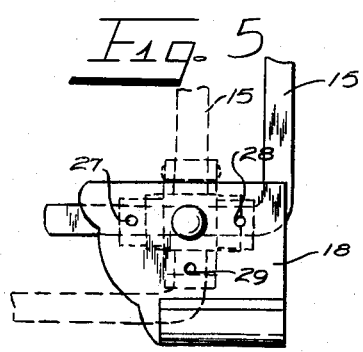
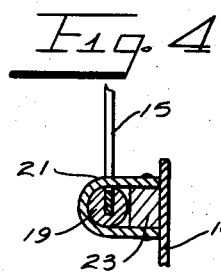
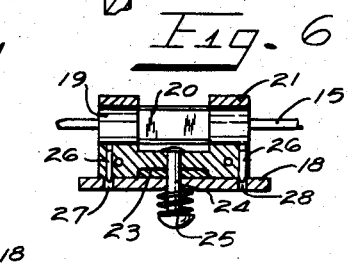
INVENTOR.
RUSSELL E. PRENTICE
ATTORNEYS Patented Aug. 16, 1949

2,479,254

UNITED STATES PATENT OFFICE 2,479,254

VIEW FINDER FOR CAMERAS

Russell E. Prentice, Dexter, Mich., assignor to General Aniline & Film Corporation, New York, N. Y., a corporation of Delaware Application February 27, 1946, Serial No. 650,719

5 Claims. (Cl. 33—64)

1

This application pertains to an invention in finders for photographic cameras, more specifically to direct or open type, eye level finders.

The invention will be described with respect to a finder, particularly adapted to use on a press type camera having a revolving back, but it is to be understood that the invention is not limited to the above type of instrument, but may be employed with cameras of all types to which it is adapted.

Among the objects of the invention is that of providing an open finder and cameras of the conventional type which is quickly and readily swung about a pivot to a position in which it may be folded into the camera casing as the lens and bellows are retracted and moved to active position when it is to be used in taking a picture.

Another object of the invention is that of providing a finder for cameras of the revolving back type which may be employed for taking pictures, the rectangular frame of which is either vertical or horizontal, by a simple swinging of the finder about its universally pivoted mounting.

It is another object of the invention to provide a finder of this type which may be used for framing scenes either horizontally or vertically without changing the pivot point or mounting of the finder and without making any other change than that of swinging the finder from one position to another in either of which the scene to be photographed will coincide with that to be registered on the film, except possibly for a small amount of parallax.

It is another object of the invention to devise a finder which shall be of rugged construction and which shall be easily movable to the various positions which it may occupy and which shall be securely held in any of these positions.

A further object is that of providing such a finder which, although securely held in any of its temporarily occupied positions shall not be subject to easy damage due to accidental or other misuse.

Other objects will be apparent as the description proceeds.

In the figures of drawing:

Fig. 1 is an elevation of a press type camera to which the open finder of the case has been applied.

Fig. 2 is a detail showing the mounting for the finder supporting pivot and the pivot itself.

Fig. 3 is a section taken at line 3—3, Fig. 2.

Fig. 4 is a section taken at line 4—4, Fig. 2.

Fig. 5 is a detail of the finder mounting and of certain parts of the pivot itself, the finder being indicated in two of the different positions which it may occupy.

Fig. 6 is a section taken at line 6—6, Fig. 3.

Now referring to Fig. 1, a typical press camera has been shown, the same including a casing 10, lens mount 11, lens or objective 12, bed 13, and a combined optical range and view finder 14. The open type finder comprises a front rectangular frame 15 which is preferably made from sheet material substantial enough to stand reasonably hard usage and to retain its shape. This frame is preferably, although not necessarily, so constructed as to have considerable width of material as compared to the usual wire finder frames. This assures that the frame will not appear blurred to the photographer as he focuses his eye on a distant object and, therefore, the outline or frame of the picture being taken is more definitely defined than when using a frame, the material of which is relatively thin as it appears to the eye held at the rear finder element.

The rear finder element includes a small rectangular frame 16 at the outer end of a swinging arm 17 pivoted at the back of the camera casing or otherwise attached thereto. Of course, the distance between the finder elements 15 and 16 is such that, when combined with the relative size of the rectangular apertures therein, the eye applied to the rear finder element will see a framed scene identical with that image projected by the lens at the focal plane, if the lens is employed at its normal extension.

The mounting for the front finder frame 15 includes a more or less universal type of pivoting or swiveling mechanism which is carried by a bracket 18 attached by suitable screws or other means at the top or some other appropriate part of the lens mounting board 11. This pivot or swivel mounting for the frame 15 includes among other elements a cylindrical bearing 19 through which one side of the frame 15 extends. This cylindrical bearing 19 is flattened as at the portion 20, Fig. 3. The ends of this cylindrical bearing fit within straps 21 and 22 which are in turn connected to a rectangular block 23. This rectangular block extends behind the cylindrical bearing 19 and is held in contact with the bracket 18 by means of mechanism presently to be described.

As shown in Figs. 3 and 6, the block 23 which is of thinner section at its central part has a rivet 24 extending through it and through bracket 18 and carrying a compression spring 25. This spring maintains the entire pivot or swivel mechanism in position against the bracket but permits rotation thereof about the rivet as a center. To maintain the frame in its intended positions, projections 26, one at either side, engage within some one or more of three holes or indentations 27, 28, or 29, thereby temporarily locking the finder in position, but permitting it to be forcefully moved to some other position. The projections 26 have rounded ends so they may be disengaged from the holes or indentations as the spring 25 permits.

The three holes provide for holding the frame in position to take a horizontally framed picture, a vertical picture, or for folding it inwardly in front of the lens carriage in which position it may enter the camera casing as the lens and bellows are folded into the casing.

The flattened part 20 of the cylindrical bearing which carries the frame 15 is engaged at both sides by a spring clip 30, Fig. 3. This spring clip is retained in position after the parts are assembled since it is positioned between the bracket 18 and the block 23 and has a hole through which the rivet 24 passes.

From the description of parts above given it can be seen that the mechanism provides for turning the frame 15 on bearings 19 throughout an angle of 180°. The device is also capable of being rotated about the rivet 24 and is also retained in any one of three different positions as projections 26 engage within the holes or indentations 27, 28, or 29. To change the frame from its full-line position to the dotted-line position as is necessary for taking a vertically framed picture, it is first swung downwardly through 180° or to the exact opposite position from that illustrated in Figs. 1 and 3. Then, it is rotated through 90°, counter-clockwise until it assumes the dotted-line position, Fig. 1.

The position of the frame 15 with respect to the pivot and the relative position of the latter, with respect to the camera and to the rear finder element 16, is such that the frame's center is properly disposed for taking pictures in either its horizontal or vertical positions. When it is desired to fold the frame inwardly so that the camera case may be closed, it is merely rotated 180° about rivet 24 in either direction from the full-line position of Fig. 1. It may be necessary to swing the frame forwardly so as to clear the lens. When swung to that position, the frame 15 will not contact any working parts and will not be in the way of the shutter, lens, nor will it otherwise interfere with taking a picture when using the optical finder. Of course, if the optical finder only is to be employed, it is not necessary to disturb the open finder so the camera may be opened, the lens and bellows extended and the instrument employed at will without disturbing the parts 15 and 16. At any time they may be easily moved to active position by a simple swinging of the front element about its pivot and by sliding or swinging the rear finder member to the position of Fig. 1. It is not necessary to detach any of the parts and it is further impossible to move the finder 15 to any position in which it can be normally viewed through the rear finder 16 except those positions in which it will correctly frame a picture either horizontally or vertically. Of course, cameras of this type frequently have a revolving back for selectively positioning the film or plate, and as that back is rotated to take a picture framed either vertically or horizontally, the front finder 15 may be correspondingly moved to proper relationship.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A finder for photographic cameras comprising a member by which the finder is attached to a part of the camera, a frame, and means by which the frame is attached to the member and by which it may be moved to and retained in positions for selectively viewing horizontally framed or vertically framed scenes, which includes a pivot substantially parallel to the optical axis of the camera to which the finder is attached, and a second means about which the frame can be rotated about an axis at right angles to said optical axis, and means for temporarily retaining said frame against displacement about the pivot and about the axis of rotation transverse to said pivot.

2. A finder for photographic cameras comprising a member by which the finder is attached to a part of the camera, a frame, and means by which the frame is attached to the member and by which it may be moved to and retained in positions for selectively viewing horizontally or vertically framed scenes, which includes a pivot substantially parallel to the optical axis of the camera to which the finder is attached, and a second means about which the frame can be rotated about an axis at right angles to said optical axis, and resilient means for maintaining said frame in either one of two positions relatively to the said axis about which it is rotated, and other resilient means and at least one projection and indentation in which said projection may engage for temporarily retaining the frame and parts within which it is held from displacement about the pivot.

3. A finder for photographic cameras comprising a member by which the finder is attached to a part of the camera, a frame, and means by which the frame is attached to the member and by which it may be moved to and retained in positions for selectively viewing horizontally or vertically framed scenes, which includes a pivot substantially parallel to the optical axis of the camera, a block carried by and movable about said pivot, bearing means for retaining said frame in operative relationship to said block, said bearing means having a flattened surface for engagement by a resilient means carried by the block and by which the frame may be temporarily held in either one of two positions, and means including a spring for urging said block into engagement with the member by which the finder is attached to the camera, a projection and an indentation, one of which forms a part of the block and the other of which is a part of the member, by which the frame is temporarily retained in one of at least two different positions.

4. A finder for photographic cameras comprising a member by which the finder is attached to a part of the camera, a frame, and means by which the frame is attached to the member, and by which it may be moved to and retained in positions for selectively viewing horizontally or vertically framed scenes, which includes a block, pivot means by which said block is retained in operative relationship to the said member, a spring on said pivot means for urging said block into engagement with the said member, means for temporarily retaining said block in any one of three different positions with respect to said member, and means about which said frame may be rotated about an axis at right angles to the optical axis of the camera which includes bearing means at one side of said frame and connecting straps passing about said bearing and attached to the said block, a flat side on said bearing means, and a spring for engagement with said flat side of the bearing means for selectively retaining the frame in either one of two different operative positions.

5. A finder for photographic cameras comprising a member by which the finder is attached to a part of the camera, a frame, and means by which the frame is attached to the member and by which it may be moved to and retained in positions for selectively viewing horizontally or vertically framed scenes, which includes a block, pivot means passing through said block and through said member and a spring for drawing said block into engagement with the member, means for temporarily retaining said block in any one of three different positions which means includes projections from said block, indentations in said member within which said projections may engage as the block is turned about its pivot, and means about which said frame may be rotated about an axis at right angles to the optical axis of the camera, which includes bearing means at one side forming a part of one side of said frame and means extending from said block within which said bearing means is retained, but within which it is free to turn, said bearing means having opposed flattened sides, and a spring clip attached to said block and engageable with the flattened sides of said bearing means for retaining the frame in two positions, one of which is 180° removed from the other, the said pivot about which the block may be turned being disposed in alignment with that side of the frame of which the bearing means is a part and at such distance from the ends of the frame that, when attached to the camera in proper position, the said frame may be employed for viewing both horizontally or vertically framed scenes.

RUSSELL E. PRENTICE.

REFERENCES CITED

The following references are of record in the file of this patent:

UNITED STATES PATENTS

| Number | Name | Date |
| --- | --- | --- |
| 1,088,492 | Walters et al. | Feb. 24, 1914 |
| 1,684,821 | Eastman | Sept. 18, 1928 |
| 2,040,935 | Githens | May 19, 1936 |